No. 798,285. PATENTED AUG. 29, 1905.
T. J. KEHOE.
MOTION TRANSMITTING MECHANISM.
APPLICATION FILED JUNE 22, 1904.
2 SHEETS—SHEET 1.

No. 798,285. PATENTED AUG. 29, 1905.
T. J. KEHOE.
MOTION TRANSMITTING MECHANISM.
APPLICATION FILED JUNE 22, 1904.

2 SHEETS—SHEET 2.

WITNESSES:
Herman Lampke
C. J. Lose

Thomas J. Kehoe INVENTOR.
BY W. G. Burns
ATTORNEY.

UNITED STATES PATENT OFFICE.

THOMAS J. KEHOE, OF FORT WAYNE, INDIANA, ASSIGNOR, BY DIRECT AND MESNE ASSIGNMENTS, TO WAYNE GEAR AND MACHINE COMPANY, A CORPORATION OF INDIANA.

MOTION-TRANSMITTING MECHANISM.

No. 793,285. Specification of Letters Patent. Patented Aug. 29, 1905.

Application filed June 22, 1904. Serial No. 213,615.

*To all whom it may concern:*

Be it known that I, THOMAS J. KEHOE, a citizen of the United States of America, and a resident of Fort Wayne, in the county of Allen and State of Indiana, have invented certain new and useful Improvements in Motion-Transmitting Mechanism, of which the following is a specification.

This invention relates to improvements in motion-transmitting mechanism; and the objects thereof are, first, to transmit motion from a suitable source of power to a transmission-shaft at various speeds and also to transmit reverse motion to said transmission-shaft; second, to provide suitable mechanism to be controlled by a single lever which will effect the proper connections in the mechanism by which the various speeds and reverse motion are obtained, and, third, to provide cushions to ease the shock occasioned by the engagement of the clutch-dogs with the toothed rings. These objects are accomplished by the construction illustrated in the accompanying drawings, in which—

Figure 1:
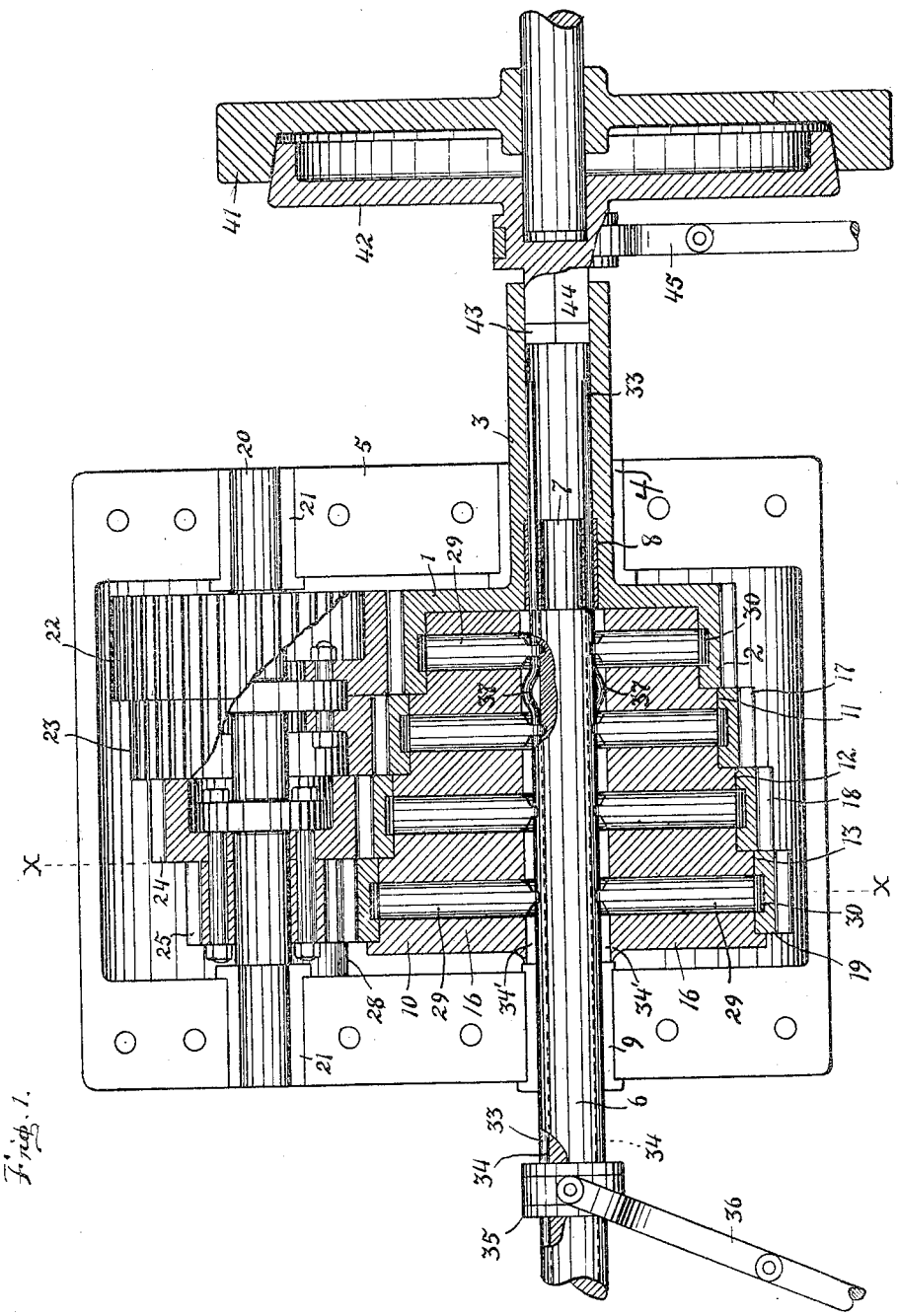
Figure 2:
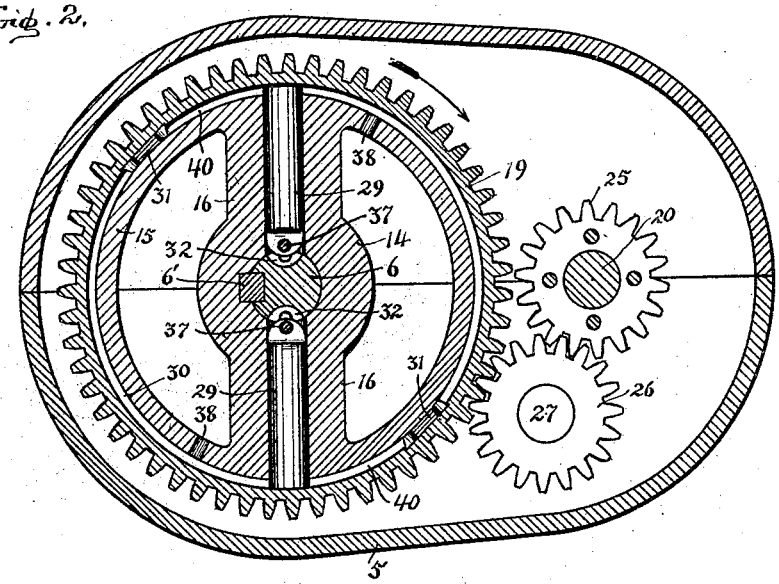
Figure 3:
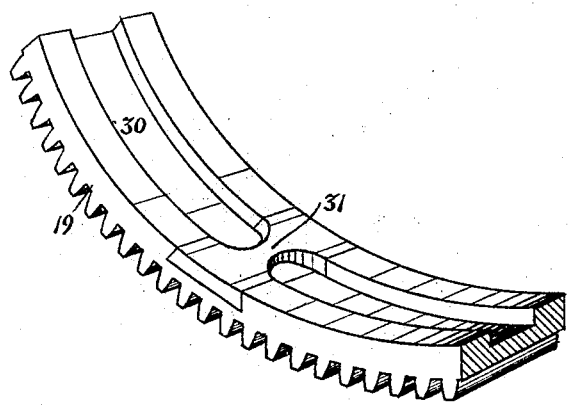

Figure 1 is a plan of the invention, shown partly in horizontal central section. Fig. 2 is a transverse section of the device on the line *x x* of Fig. 1. Fig. 3 is a perspective view showing a segment of one of the toothed rings.

Similar numerals of reference indicate corresponding parts throughout the several views.

The construction of this invention consists of a driving-gear 1, which has a toothed flange 2, and a tubular journal 3, which rests in a suitable bearing 4, the latter being arranged in a gear-case 5. A transmission-shaft 6 is mounted in line with the axial center of the driving-gear 1, the adjacent end 7 thereof extending into the tubular journal 3 and has fixed thereon a bushing 8, which rotates with said transmission-shaft, but is rotatively movable in said journal 3. The said transmission-shaft rests in a bearing 9, which is carried by the case 5. This bearing of course is arranged in line with the bearing 4. Upon said transmission-shaft within said gear-case is rigidly mounted a clutch member 10, the outer part of which is made in the form of a step-cone and presents a series of annular bearing-surfaces 11, 12, and 13 of various diameters. The said clutch member has a hub 14 and shell 15, the latter being connected with the former by oppositely-disposed arms 16. Upon said bearing-surfaces 11, 12, and 13 are loosely arranged the toothed rings 17, 18, and 19, respectively, which are adapted to be rotated idly relative to the shell 15 and upon the respective bearing-surfaces.

A counter-shaft 20 is mounted in bearings 21, which are carried by the case 5, and said counter-shaft ranges parallel with the transmission-shaft 6 and carries a series of gears 22, 23, 24, and 25, all of which are adapted to move in unity. The gear 22 is arranged in mesh with the driving-gear 1, and the gears 23 and 24 are arranged, respectively, in mesh with the toothed rings 17 and 18. The gear 25 is arranged in driving connection with the pinion 26, which is mounted upon a suitable stud 27, which extends from a boss 28, the latter being part of the case 5, and said pinion 26 meshes also with the toothed ring 19. When the driving-gear 1 is rotated, the gears 22, 23, 24, and 25 will be accordingly driven, and the toothed rings 17 and 18 will be driven in one direction because of their connections with the respective gears 23 and 24, and the toothed ring 19 will be driven in the opposite direction because of the connection of the intermediate pinion 26 with said toothed ring 19 and gear 25. It will be understood that when the driving-gear 1 is in constant motion the said toothed rings will likewise move constantly, but at various speeds, and the toothed ring 19 will be rotated in the opposite direction to that of the other toothed rings aforesaid. However, the clutch member 10 and the transmission-shaft 6, upon which the same is mounted, will not be actuated because of the rotation of the driving-gear 1 and said toothed rings unless suitable connection is effected between said clutch member and one or the other of the several toothed rings or between said clutch member and said driving-gear 1. It will appear that the clutch member will be rotated in such direction and at such speed comparably direct with the rotation of the toothed ring or driving-gear, as the case may be, with which the same becomes engaged. To effect engagements severally between the clutch member 10 and the respective toothed rings and the driving-gear 1, I have arranged within the arms 16 of said clutch member movable dogs 29, which are adapted to be pressed diametrically outward or drawn inward.

Grooves 30 are made in the inner sides of each of the toothed rings and also in the inner side of the flange of the driving-gear 1, the said grooves being adapted to receive the ends of the respective dogs 29. Stops 31 are arranged transversely in said grooves which are adapted to become engaged by the ends of said dogs, and thus driving engagements are effected between the clutch member and the toothed rings and driving-gear. The dogs 29 are arranged in opposite pairs and each has a narrowed inner end which enters a corresponding recess 32, made in the transmission-shaft 6 when drawn to its innermost position. Operating-rods 33 are arranged in suitable grooves 34 in the transmission-shaft and extend loosely through the body of the bushing 8. A sliding collar 35 is mounted upon the transmission-shaft at a point external of the case 5 and has connection with each of the rods 33, by means of which said rods are adapted to be moved lengthwise in said grooves 34.

A pivoted lever 36 has operating connection with the collar 35, by which said collar may be shifted lengthwise upon the transmission-shaft. The said rods extend loosely through the adjacent narrowed inner ends of said dogs 29 and are adapted to normally hold said dogs in their innermost positions except when the outwardly-extending crooks 37, which are made in said rods, coincide with the said inner ends of the dogs, at which times said dogs are pressed outward thereby. The said crooks are made in said rods at such points as to occupy opposite corresponding positions respecting the transmission-shaft, so that the diametrically opposite dogs will be actuated thereby in opposite pairs. In Fig. 2 the rods are shown as shifted so that the section intersects the crooks, and therefore the dogs appear in their outermost positions. However, if the rods were shifted so that the crooks would not coincide with the dogs the said dogs would appear in their innermost positions, so that the ends thereof would clear the stops 31, and thus the ring 19 would be free to rotate idly upon the clutch members 10.

In the rim 15 of the clutch member are made openings 38, through which oil contained in the case 5 may enter and fill the several grooves 30, respectively, in said toothed rings and driving-gear. The oil thus contained in said grooves will serve as a cushion between the dogs and the stops 31 as the latter approach the former for engagement. The oil in the grooves within the spaces 40 between the ends of the dogs and said stops will escape therefrom more or less gradually by working out laterally between the toothed rings and the shell 15 or past the projecting ends of the dogs, because of the consequent pressure within said spaces occasioned by the approach of the stops toward said dogs. Thus the engagement of the rings or driving-gear with the clutch member will not be accompanied by a sudden shock.

The relation between the clutch member and transmission-shaft is fixed, the former being secured to the latter by means of a key 6', and the rods 33 are longitudinally movable relative to said clutch member and transmission-shaft, the rods ranging within the grooves 34, except the crooks 37, which extend into and slide in grooves 34', which are made in the clutch member and register with the grooves 34 in said transmission-shaft.

The driving-gear may be actuated by any suitable means—such, for example, as an engine-wheel 41 and a friction clutch-wheel 42, ranged between said engine-wheel and the tubular journal 3 of said driving-gear. In the drawings the tubular journal is shown with a squared inner bore 43 at its outer end and a corresponding squared boss 44, which projects centrally from the clutch-wheel 42, extends loosely into the squared portion of the journal 3, so as to be shifted longitudinally therein as said clutch-wheel is moved into and from engagement with said engine-wheel 41 by any suitable means, such as a pivoted lever 45.

Having described my invention, what I claim as new, and desire to secure by Letters Patent, is -

1. In mechanism of the class described, a driving-gear rotatively mounted; a transmission-shaft arranged in line with the axis of said driving-gear; a counter-shaft, parallel with the transmission-shaft, and having connection with said driving-gear to be actuated thereby; a clutch member, rigidly fixed upon said transmission-shaft, having the form of a step-cone; a series of toothed rings of various diameters arranged loosely upon corresponding bearing-surfaces on said clutch member; stops carried by said toothed rings and also by said driving-gear; a series of gears, of various diameters, carried by said counter-shaft, and meshing respectively with the corresponding toothed rings to drive the same; movable dogs arranged within said clutch member and being adapted to form connections, severally, with the respective toothed rings or driving-gear by engagements with said stops; and means to operate said dogs.

2. In mechanism of the class described, a driving-gear rotatively mounted; a transmission-shaft arranged in line with the axis of said driving-gear; a clutch member rigidly fixed upon said transmission-shaft, having several annular bearing-surfaces; a series of toothed rings arranged upon the respective bearing-surfaces of said clutch member, and being adapted to be driven idly thereon; means to actuate said toothed rings at various rates of speed; a series of movable dogs arranged within said clutch member and being adapted to be pressed diametrically outward or drawn inward; means carried by said toothed rings and driving-gear adapted to engage the outer ends of said dogs when the latter are pressed outward; and operating means in connection with said transmission-shaft and clutch member to press diametrically outward or draw inward said dogs in diametrically opposite pairs severally.

3. In mechanism of the class described, a rotatively-mounted driving-gear having a central tubular journal; a transmission-shaft arranged in line with the axis of said driving-gear and having a bearing-support within said tubular journal; a clutch member rigidly fixed upon said transmission-shaft; a series of toothed rings mounted upon said clutch member and being adapted to rotate idly thereon; means in connection with the driving-gear to actuate the said toothed rings at various rates of speed; a series of movable clutch-dogs arranged within said clutch member and being adapted to be shifted into engagement, in pairs severally, with the respective toothed rings and driving-gear; and operating means in connection with said transmission-shaft to engage and disengage said dogs from said toothed rings and driving-gear.

4. In mechanism of the class described, a driving-gear having a toothed flange; a transmission-shaft arranged in line with the axis of said driving-gear; a clutch member rigidly fixed upon said transmission-shaft, a portion of which ranges within the flange of said driving-gear; one or more toothed rings mounted to rotate idly upon said clutch member; and means in connection with said driving-gear and toothed rings to actuate the latter; means within said clutch member to engage severally said toothed rings and driving-gear.

5. In mechanism of the class described, a driving-gear having a toothed flange; a transmission-shaft arranged in line with the axis of said driving-gear; a clutch member rigidly fixed upon said transmission-shaft, a portion of which ranges within the flange of said driving-gear; toothed rings mounted to rotate idly upon said clutch member; means in connection with said driving-gear and toothed rings to actuate the latter at various rates of speeds; grooves in the inner sides of said rings and the flange of said driving-gear; stops arranged transversely in said grooves; means to admit fluid into said grooves; a series of movable dogs arranged within said clutch member adapted to be pressed diametrically outward or drawn inward, the outer ends of said dogs being adapted to extend into said grooves and become engaged by said stops respectively, and means to operate said dogs.

6. In mechanism of the class described, a transmission-shaft; a clutch member rigidly fixed upon said transmission-shaft; one or more idly-driven rings encircling said clutch member; movable dogs carried by said clutch member, and being adapted to engage severally with said rings; operating-rods ranging parallel with the transmission-shaft and extending through said dogs; an outwardly-extending crook in each of said rods adapted to move said dogs outward or inward as said crooks are drawn into or out of engagement with said dogs respectively; and means to move said operating-rods.

7. In mechanism of the class described, a driving-gear having a toothed flange and a central tubular journal; a transmission-shaft arranged in line with the axis of said tubular journal; a bushing rigidly fixed upon the end of the transmission-shaft and ranging loosely within said tubular journal to be supported thereby; a clutch member rigidly fixed upon the transmission-shaft, a portion of which ranges within the flange of the driving-gear; one or more toothed rings encircling said clutch member and being adapted to rotate idly thereon; means in connection with the driving-gear and toothed rings to actuate the latter; movable dogs arranged within said clutch member and being adapted to engage severally said rings and the toothed flange of said driving-gear; operating-rods ranging parallel with the transmission-shaft, extending loosely through said dogs, and having also a sliding support in said bushing; an outwardly-extending crook in each of said rods adapted to move said dogs respectively outward or inward as said crooks are drawn into or out of engagement with said dogs respectively; and a suitable lever having connections with said rods to actuate the same.

8. In mechanism of the class described, a transmission-shaft; a clutch member fixed upon said shaft; rings loosely mounted upon said clutch member; dogs carried by said clutch member adapted to engage severally said rings; and operating-rods extending through said clutch member and having working relation with said dogs to actuate the same severally.

In testimony whereof I affix my signature in presence of two witnesses.

THOMAS J. KEHOE.

Witnesses:
J. W. DICKENS,
W. G. BURNS.